(12) United States Patent
Kim

(10) Patent No.: US 10,890,310 B2
(45) Date of Patent: Jan. 12, 2021

(54) FREEZING PREVENTIVE LED LAMP

(71) Applicant: CRESLITE Inc, Goyang-si (KR)

(72) Inventor: Dong Sun Kim, Goyang-si (KR)

(73) Assignee: CRESLITE INC, Goyang-si (KR)

( * ) Notice: Subject to any disclaimer, the term of this patent is extended or adjusted under 35 U.S.C. 154(b) by 164 days.

(21) Appl. No.: 16/156,678

(22) Filed: Oct. 10, 2018

(65) Prior Publication Data

US 2020/0056756 A1     Feb. 20, 2020

(30) Foreign Application Priority Data

Aug. 17, 2018  (KR) ........................ 10-2018-0095865

(51) Int. Cl.
*F21S 45/60* (2018.01)
*H05B 1/02* (2006.01)
*F21S 41/25* (2018.01)
*F21S 41/30* (2018.01)
*F21S 41/141* (2018.01)
*H05B 45/00* (2020.01)

(52) U.S. Cl.
CPC ............. *F21S 45/60* (2018.01); *F21S 41/141* (2018.01); *F21S 41/25* (2018.01); *F21S 41/30* (2018.01); *H05B 1/0288* (2013.01); *H05B 45/00* (2020.01)

(58) Field of Classification Search
CPC .. F21S 45/60; F21S 41/25; F21S 41/30; F21S 41/141; H05B 45/00; H05B 1/0288
USPC ........................................................... 307/31
See application file for complete search history.

(56) References Cited

FOREIGN PATENT DOCUMENTS

KR   10-2017-0027998 A    3/2017

*Primary Examiner* — Hal Kaplan
(74) *Attorney, Agent, or Firm* — John K. Park; Park Law Firm

(57) ABSTRACT

Provided is an LED lamp for prevention of freezing, comprising: a housing opened at a front side thereof; an LED unit disposed inside the housing; a lens mounted at the opened front side of the housing and configured to allow lighting light emitted from the LED unit to transmit therethrough; a heating member disposed at the rear side of the lens and configured to generate heat by being supplied with power; a sensor unit disposed at the inside of the housing and configured to sense the internal temperature of the housing; and a control unit configured to control the power supplied to the heating member depending on the internal temperature of the housing, sensed by the sensor unit.

8 Claims, 4 Drawing Sheets

FREEZING PREVENTIVE LED LAMP

CROSS-REFERENCE TO RELATED APPLICATIONS

This application claims the benefit of Korean Patent Application No. 10-2018-0095865, filed on Aug. 17, 2018 in the Korean Intellectual Property Office, which is incorporated herein by reference in its entirety.

BACKGROUND OF THE INVENTION

1. Field of the Invention

The present invention relates to an LED lamp for prevention of freezing, which is configured to prevent a freezing phenomenon occurring at a vehicular lamp in a severe cold environment, and more particularly, to an LED lamp for prevention of freezing, which is configured to be applied to snowplow vehicles that clean roads covered with snow and ice during a blizzard in a very cold area to improve a driver's visibility and promote the convenience of snow-removing works.

2. Description of Related Art

In recent years, a lamp employing an LED has been used as a vehicular lighting owing to the improvement of the light output power of a high-luminance LED package and the development of a high-quality vehicular lighting technology using the LED.

In other words, LEDs can reduce a considerable amount of energy compared to existing halogen bulbs. In addition, LEDs provide a high-luminance light, and thus is applied as a headlamp light source for a vehicle.

However, such LEDs entail a problem in that they cannot be used as the vehicular headlamp light source in areas where snow falls frequently, for example, the northern region of Canada or the U.S., the Far East region of Russia, the East Europe, and the like.

The reason for this is that a freezing phenomenon occurs in which the surface of a headlamp is frozen due to the combined effect of low temperature and wind in the severe cold environment, and snow accumulated on vehicles, etc., and such LEDs cannot provide a lighting light of a heating temperature sufficient for melting snow and ice adhered to the surface of the headlamp.

Accordingly, a halogen bulb that provides a heating temperature and a light of a temperature higher than that of LEDs is applied as a light source of the vehicular headlamp so as to melt the frozen surface of the headlamp in the cold regions as mentioned above.

However, the vehicular headlamp adopting the halogen bulb has a drawback in that since the headlamp irradiate a warm white light, it has a visibility lower than that of an LED lamp irradiating a cool white light, thereby decreasing visibility of a driver of a vehicle traveling a region where snow has been accumulated during the severe winter season is lowered, and thus leading to safety accidents.

In particular, a vehicle manufactured for the special purposes such as a snowplow car is mainly operated in the early dawn time or at night when the frequency of vehicle operations is relatively low so that general vehicles can travel smoothly on the road. For this reason, a special vehicle driver cannot help paying exceptional attention to traveling for the prevention of safety accidents according to the vehicle's traveling operation.

Currently, an LED lamp is being developed which can be used as a vehicular headlamp even in the above-mentioned cold regions, i.e., severe cold environments. Nevertheless, the research and development of an LED lamp is still insufficient which can satisfy the intrinsic function of a lighting device while efficiently heating the frozen surface of the headlamp. Furthermore, the development of an LED lamp that meets the motor vehicle safety standards of the above-mentioned countries is unsuccessful actually.

Therefore, the applicant has devised the present invention to solve the above-mentioned problems associated with the conventional LED lamp, and Korean Patent Laid-Open Publication No. 10-2017-0027998 entitled "Lamp for Vehicles" has been disclosed as a prior art document related with the present invention.

SUMMARY OF THE INVENTION

Accordingly, the present invention has been made in order to solve the above-described problems occurring in the prior art, and it is an object of the present invention to provide an LED lamp for prevention of freezing, which is configured to prevent a freezing phenomenon of a vehicular headlamp, which occurs in the severe cold region, and the same time providing a driver with high visibility, thereby ensuring a safe driving environment at night or in the early dawn time.

Another object of the present invention is to provide an LED lamp for prevention of freezing, which is configured to sense the temperature of a vehicular headlamp in real time and melt snow or ice adhered to the surface of the headlamp using a power source of a vehicle itself without any use of a separate external power source.

To accomplish the above object, in accordance with the present invention, there is provided an LED lamp for prevention of freezing, including: a housing opened at a front side thereof; an LED unit disposed inside the housing; a lens mounted at the opened front side of the housing and configured to allow lighting light emitted from the LED unit to transmit therethrough; a heating member disposed at the rear side of the lens and configured to generate heat by being supplied with power; a sensor unit disposed at the inside of the housing and configured to sense the internal temperature of the housing; and a control unit configured to control the power supplied to the heating member depending on the internal temperature of the housing, sensed by the sensor unit.

In addition, the control unit may drop a voltage being applied to the heating member if the internal temperature of the housing, sensed by the sensing unit, is higher than a predetermined temperature, and boost a voltage being applied to the heating member if the internal temperature of the housing, sensed by the sensing unit, is lower than the predetermined temperature.

In addition, the heating member may generate heat by being applied with power from the control unit when power is applied to the LED unit.

In addition, the control unit may include: an analysis unit configured to compare the internal temperature of the housing, sensed by the sensing unit, with the predetermined temperature, and analyze a compared result; and a transformer unit configured to receive the compared result from the analysis unit and boost or drop a voltage to be applied the heating member based on the compared result.

In addition, the predetermined temperature may range from 40° C. to 60° C.

In addition, the heating member may be a transparent electrode film attached on the inner surface of the lens.

In addition, the sensor unit may be disposed at a position that is not affected by the lighting light emitted from the LED unit.

Moreover, the LED lamp may further include a reflector disposed at the inside of the housing and configured to receive lighting light emitted from the LED unit and reflect the emitted lighting light to the lens, wherein the reflector may include: a reflective plate inserted into the internal space part of the housing and configured to receive the lighting light emitted from the LED unit; a frame part formed protrudingly radially from a front end portion of the reflective plate and connected to a front end portion of the housing; and a through-hole formed at a vertical portion of the frame part and configured to allow the sensor unit to be inserted thereinto.

Effects of the Invention

The LED lamp for prevention of freezing according to an embodiment of the present invention can promptly resolve a freezing phenomenon of a vehicular headlamp, which occurs in the severe cold region or in the cold weather so that a driver can stably drive a vehicle even at night or in the early dawn time.

In addition, the LED lamp for prevention of freezing according to an embodiment of the present invention has a structure that can prevent a freezing phenomenon in which the surface of a lens is frozen even though an LED is used as a lighting source that emits lighting light, thereby reducing the vehicle operation costs according to vehicle running or the manufacture costs of the lamp, as well as improving a driver's visibility.

Further, the LED lamp for prevention of freezing according to an embodiment of the present invention is applied to a special vehicle such as a snowplow car so that the special vehicle can smoothly perform its inherent function even in the heavy snowfall or freezing weather, as well as is also applied to a general vehicle running in the cold region such as Canada or Russia so that a freezing phenomenon frequently occurring on the lamp surface can be addressed promptly.

BRIEF DESCRIPTION OF THE DRAWINGS

The above and other objects, features and advantages of the present invention will be apparent from the following detailed description of the preferred embodiments of the invention in conjunction with the accompanying drawings, in which.

[Explanation on symbols]

| | |
|---|---|
| 100: LED lamp | 110: housing |
| 120: LED unit | 121: LED fixing member |
| 130: lens | 140: heating member |

-continued

[Explanation on symbols]

| | |
|---|---|
| 150: sensor unit | 160: reflector |
| 161: reflective plate | 162: frame part |
| 163: through-hole | 200: control unit |
| 210: analysis unit | 220: transformer unit |

DETAILED DESCRIPTION OF THE PREFERRED EMBODIMENTS

Advantages and features of the present disclosure and a method for accomplishing the advantages and feature will be apparent by way of embodiments which will be described in detail later with reference to the accompanying drawings.

However, the present invention is not limited to embodiments disclosed below but may be implemented into different forms. Embodiments are provided only for illustrative purposes and for full understanding of the scope of the present invention by those skilled in the art, and the scope of the present invention is defined by the appended claims Hereinafter, an LED lamp for prevention of freezing according to an embodiment of the present invention will be described in detail with reference to FIGS. 1 to 4. In the following description, the detailed description on relevant known functions and constructions unnecessarily obscuring the subject matter of the present invention will be avoided hereinafter.

Figure 1:
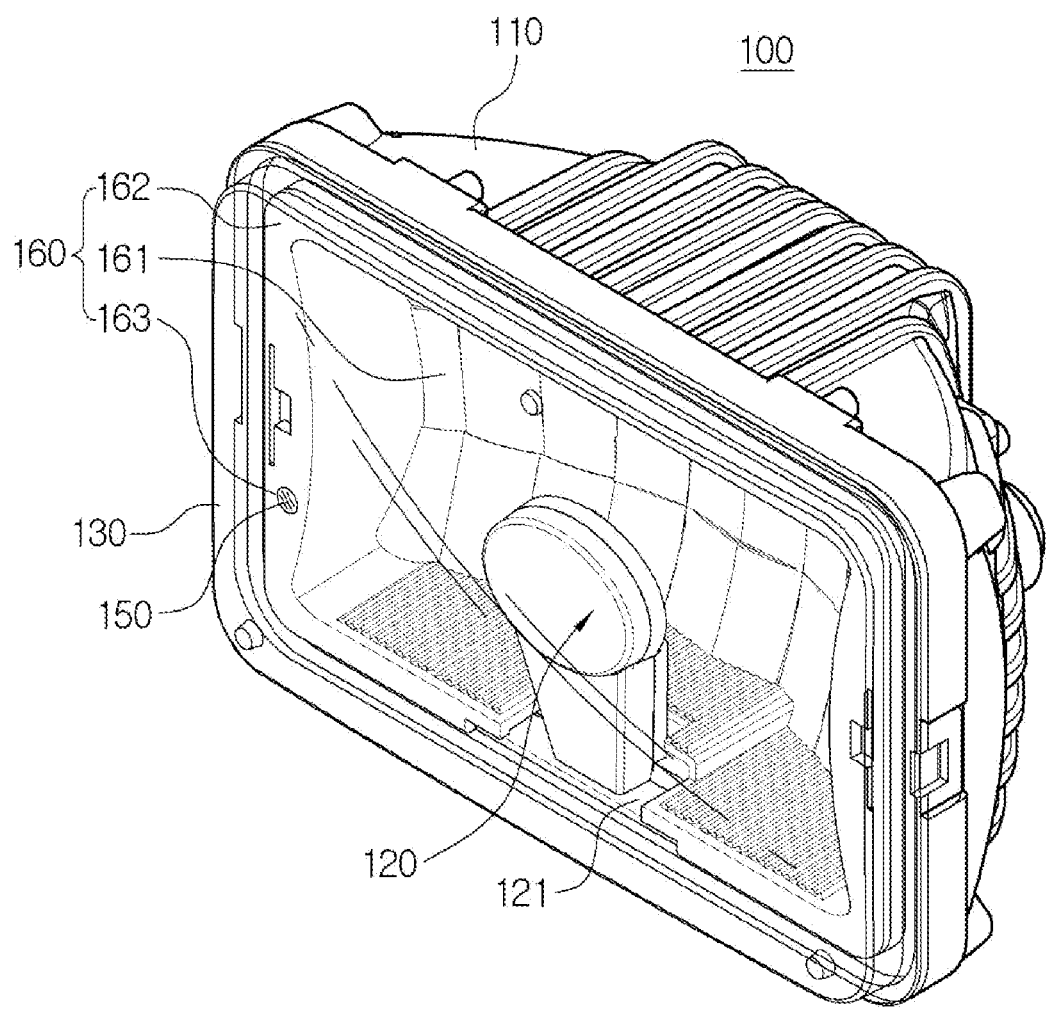
FIG. 1 is an assembled perspective view illustrating an LED lamp for prevention of freezing according to an embodiment of the present invention.
Figure 2:
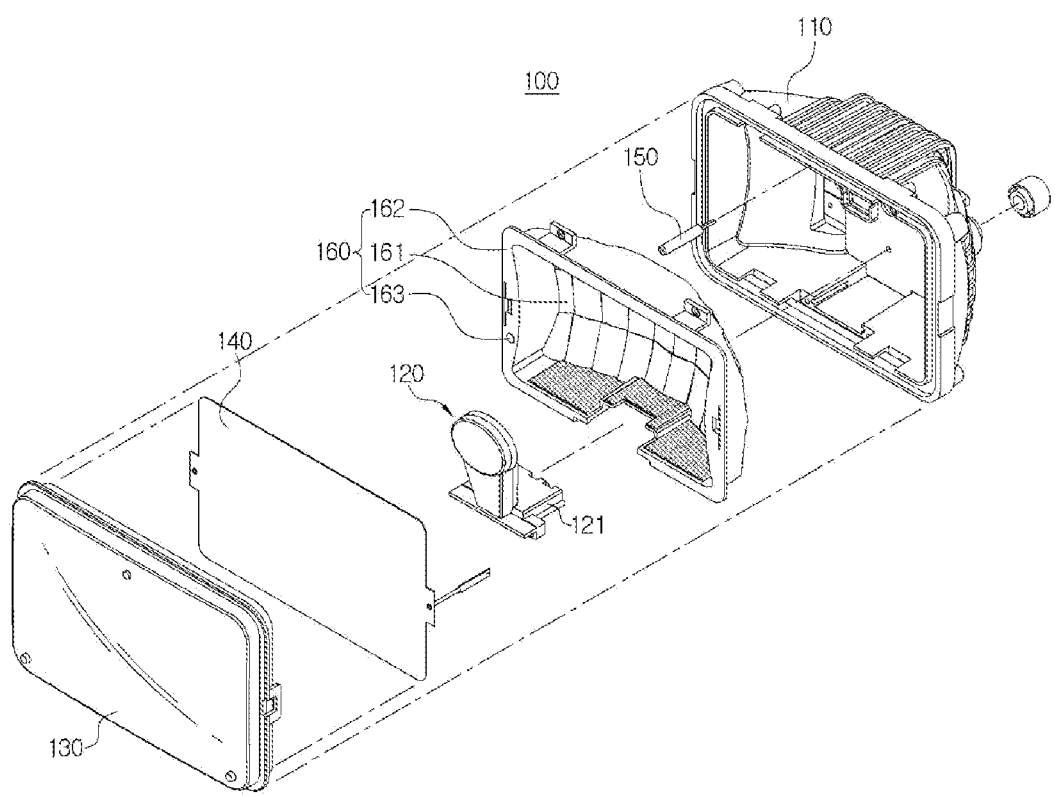
FIG. 2 is a front exploded perspective view illustrating the LED lamp shown in FIG. 1.
Figure 3:
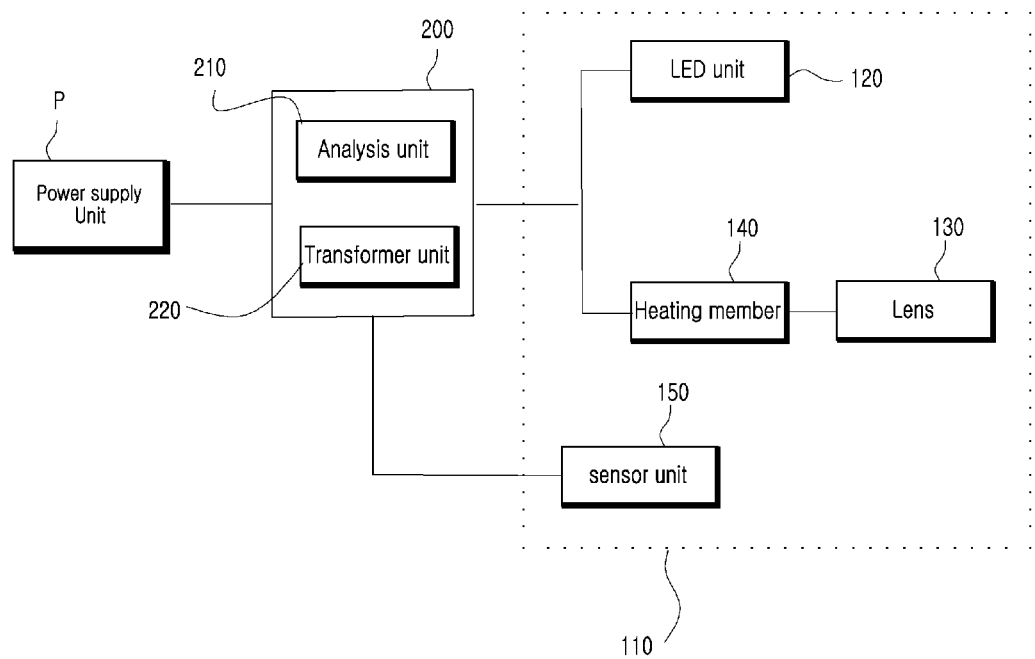
FIG. 3 is a block diagram illustrating a configuration of an LED lamp for prevention of freezing according to an embodiment of the present invention.
Figure 4:
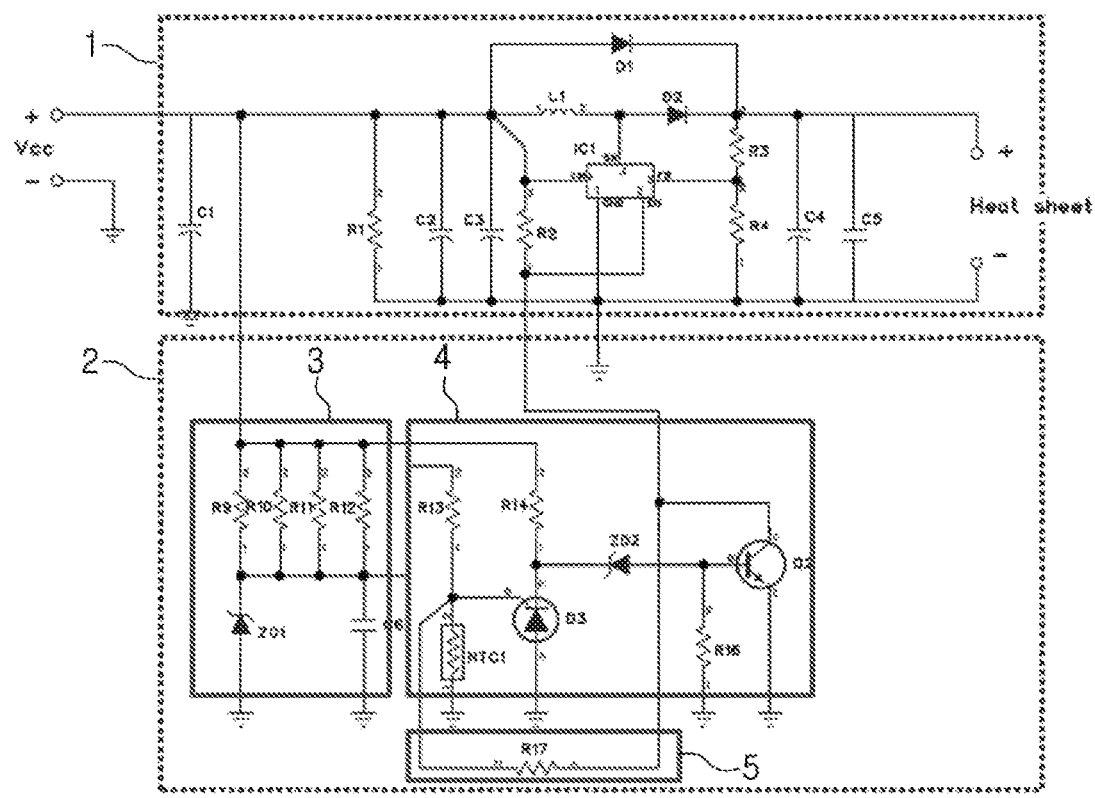
FIG. 4 is a circuit diagram illustrating an LED lamp for prevention of freezing according to an embodiment of the present invention.

FIG. 1 is an assembled perspective view illustrating an LED lamp for prevention of freezing according to an embodiment of the present invention, FIG. 2 is a front exploded perspective view illustrating the LED lamp shown in FIG. 1, FIG. 3 is a block diagram illustrating a configuration of an LED lamp for prevention of freezing according to an embodiment of the present invention, and FIG. 4 is a circuit diagram illustrating an LED lamp for prevention of freezing according to an embodiment of the present invention.

The LED lamp for prevention of freezing according to an embodiment of the present invention has a structure in which it is applied as a headlight or a special lamp for a vehicle so that the surface of a lens can be prevented from being frozen in the severe cold period or in the cold region, and particularly is also applied as a headlight for a snowplow vehicle that travels frequently in the cold region where a great amount of snow is piled up so that the freezing phenomenon of s the lens surface can be prevented, or snow or ice attached on the lens surface that has been already frozen due to non-operation of the snowplow vehicle can also be melt within a short time.

As shown in FIGS. 1 and 2, the LED lamp 100 for prevention of freezing according to the present invention includes: a housing 110 opened at a front side thereof; an LED unit 120 disposed inside the housing 110; a lens 130 mounted at the opened front side of the housing 110 and configured to allow lighting light emitted from the LED unit 120 to transmit therethrough; a heating member 140 disposed at the rear side of the lens and configured to generate heat by being supplied with power; a sensor unit 150 disposed at the inside of the housing 110 and configured to sense the internal temperature of the housing 110; and a control unit 200 (see FIGS. 3 and 4) configured to control the power supplied to the heating member 140 depending on the internal temperature of the housing 110, sensed by the sensor unit 150.

The housing 110 may be mounted at a front side of a vehicle, and has a predetermined space part defined therein to accommodate the sensor unit 150 and a reflector 160 which will be described later.

The LED unit 120 may include an LED fixing member 121 coupled to the housing 110 in a sliding manner, and an LED module (not shown) may be disposed at the top of the fixing member. In this case, the LED module may be provided on one surface of the LED fixing member 121 confronting the inner surface of the housing 110, so that the LED module can emit light toward the inner surface of the housing 110.

The lens 130, may be mounted at the opened front side of the housing 110 as described above, and may be made of a transparent plastic synthetic resin material that can allow light to transmit therethrough.

In the meantime, the LED lamp 100 may further include a reflector 160 disposed at the inside of the housing 110 and configured to receive lighting light emitted from the LED unit 120 and reflect the emitted lighting light to the lens 130.

The reflector 160 includes: a reflective plate 161 inserted into the internal space part of the housing 110 and configured to receive the lighting light emitted from the LED unit 120; a frame part 162 formed protrudingly radially from a front end portion of the reflective plate 161 and connected to a front end portion of the housing 110; and a through-hole 163 formed at a vertical portion of the frame part 162 and configured to allow the sensor unit 150 to be inserted thereinto.

The reflective plate 161 serves to reflect lighting light emitted from the LED unit 120 to the inner surface of the lens 130, and is formed in a curved shape so as to efficiently collect and reflect the lighting light emitted from the LED unit 120. In addition, the reflective plate 161 may be shaped to be accommodated in the internal space of the housing 110.

Thus, the lighting light emitted from the LED unit 120 toward the internal space of the housing 110 can be reflected by the reflective plate 161 and transferred to the lens 130.

The frame part 162 is a member that is connected to the front end portion of the housing 110 by close contact, and serves as a known flange and the sensor unit 150 which will be described later may be mounted on the frame part 162, The through-hole 163 is formed on one surface of the frame part 161, and can partially accommodate the sensor unit 150 in the longitudinal direction of the sensor unit 150.

The heating member 140 may be disposed on the inner surface of the lens 130 confronting the reflective plate 161, and it is described that the heating member 140 is implemented as a transparent electrode film attached on the whole inner surface of the lens 130 in an embodiment of the present invention.

In other words, the transparent electrode film having one surface coated with an adhesive can be attached on the inner surface of the lens 130 by use of an exclusive jig and a laminating autoclave.

The sensor unit 150 serves to sense the internal temperature of the housing 110, and can be inserted into the through-hole 163 formed on the frame part 162 of the reflector 160. The sensor unit 150 can be implemented as any one sensor selected from various known temperature detecting sensors. For reference, a temperature detecting sensor of CWF series was used in an embodiment of the present invention.

The sensor unit 150 is preferably disposed at a position that is not affected by the lighting light emitted from the LED unit 120 or the lighting light reflected by the reflector 160 toward the lens 130. In addition, the sensor unit 150 is preferably disposed at a position that is not affected by heat generated from other electrical and electronic components provided inside the housing 110.

Thus, the sensor unit 150 can be implemented such that it is inserted into the through-hole 163 formed on the frame part 162 of the reflector 160 and is protruded toward the inner surface of the lens 130. Accordingly, the sensor unit 150 can sense the internal temperature of the housing 110 at a position adjacent to the inner surface of the lens 130 and the heating member 160.

The control unit 200 can be supplied with power from a power supply unit P such as a vehicle battery for application to the LED unit 150 or the heating member 140.

Herein, the control unit 200 can drop a voltage being applied to the heating member if the internal temperature of the housing 110, sensed by the sensing unit 150, is a predetermined temperature or higher, and boost a voltage being applied to the heating member 140 if the internal temperature of the housing 110, sensed by the sensing unit 150, is a predetermined temperature or lower.

To this end, the control unit 200 include: an analysis unit 210 configured to compare the internal temperature of the housing 110, sensed by the sensing unit 150, with the predetermined temperature, and analyze a compared result; and a transformer unit 220 configured to receive the compared result from the analysis unit 210 and boost or drop a voltage to be applied the heating member 140 based on the compared result.

For reference, the predetermined temperature can be set to about 40° C. to 60° C., and may be within a temperature range sufficient for melting snow or ice adhered to the surface of the lens 130. For example, the control unit 200 can determine that snow or ice adhered to the surface of the lens 130 if the internal temperature of the housing 110 is lower than 40° C., and determine that no snow or ice adhered to the surface of the lens 130 if the internal temperature of the housing 110 is higher than 40° C.

Therefore, if the internal temperature of the housing 110 is lower than 40° C., a voltage being applied to the heating member 140 can be boosted to heat the heating member 140, and thus snow or ice adhered to the surface of the lens 130 is melt.

On the contrary, if the internal temperature of the housing 110 is higher than 40° C., a voltage being applied to the heating member 140 can be dropped to reduce the amount of power consumed.

For reference, if the internal temperature of the housing 110 is higher than 60° C., it is preferred that the amount of power being applied to the heating member 140 is controlled to be reduced without blocking a voltage being applied to the heating member 140 so that the inside of the housing 110 can be constantly maintained at a warm temperature (i.e., a temperature at which the lens surface is enough not to be frozen).

Meanwhile, preferably, the heating member 140 generates heat by being applied with power from the control unit 200 when power is applied to the LED unit 120. In other words, preferably, the heating member 140 generates heat by being applied with power from the control unit 200 when a driver of a vehicle operates the LED unit 120 in order to use a vehicular lamp.

The reason for this is that the surface of the lens 130 was frozen already by snow or freezing weather during the time when no vehicle was operated because a special vehicle such as a snowplow car is typically used in the cold region and is mainly operated at night or in the early dawn time when the frequency of vehicle operations is relatively low.

In particular, a vehicle manufactured for the special purposes such as a snowplow car is mainly operated in the early dawn time or at night when the frequency of vehicle operations is relatively low so that general vehicles can travel smoothly on the road. For this reason, a special vehicle driver cannot help paying exceptional attention to traveling for the prevention of safety accidents according to the vehicle's traveling operation.

Accordingly, preferably, the heating member 140 generates heat simultaneously with the operation of the LED unit 120 to rapidly and promptly melt snow frozen on the surface of the lens 130. Ultimately, a special vehicle such as a snowplow car can be operated rapidly at night or in the early dawn time to promptly cope with an emergency situation such as heavy snowfall.

For reference, FIG. 4 shows a circuit diagram of the LED lamp 100 for prevention of freezing according to an embodiment of the present invention.

In the circuit diagram shown in FIG. 4, a first region 1 corresponds to the power supply unit P for supply power to the heating member 140, and is a boost driver for supplying power of a constant voltage.

In addition, a second region 2 shown in FIG. 4 corresponds to the sensor unit 150, and a smaller third region 3 disposed inside the second region 2 corresponds to a power source unit for the sensor unit 150.

In addition, a smaller fourth region 4 disposed inside the second region 2 is a comparator that compares a temperature information value measured by the sensor unit 150 with a threshold value, and corresponds to the analysis unit 210 of the control unit 200.

Further, a smallest fifth region 5 disposed inside the second region 2 corresponds to a hysteresis-added resistor for preventing chattering in the threshold value, and the temperature regulation width of the heating film 140 can be determined by the resistor.

The LED lamp 100 for prevention of freezing according to an embodiment of the present invention as constructed above can promptly resolve a freezing phenomenon of a vehicular headlamp, which occurs in the severe cold region or in the cold weather so that a driver can stably drive a vehicle even at night or in the early dawn time.

In addition, the LED lamp 100 for prevention of freezing according to an embodiment of the present invention has a structure that can prevent a freezing phenomenon in which the surface of a lens is frozen even though an LED is used as a lighting source that emits lighting light, thereby reducing the vehicle operation costs according to vehicle running or the manufacture costs of the lamp, as well as improving a driver's visibility.

Further, the LED lamp 100 for prevention of freezing according to an embodiment of the present invention is applied to a special vehicle such as a snowplow car so that the special vehicle can smoothly perform its inherent function even in the heavy snowfall or freezing weather, as well as is also applied to a general vehicle running in the cold region such as Canada or Russia so that a freezing phenomenon frequently occurring on the lamp surface can be addressed promptly.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, various embodiments of the present invention are merely for reference in defining the scope of the invention, and the true technical scope of the present invention should be defined by the technical spirit of the appended claims.

What is claimed is:

1. An LED lamp for prevention of freezing, comprising:
   a housing (110) opened at a front side thereof;
   an LED unit (120) disposed inside the housing (110);
   a lens (130) mounted at the opened front side of the housing (110) and configured to allow lighting light emitted from the LED unit (120) to transmit therethrough;
   a heating member (140) disposed at the rear side of the lens and configured to generate heat by being supplied with power;
   a sensor unit (150) disposed at the inside of the housing (110) and configured to sense the internal temperature of the housing (110); and
   a control unit (200) configured to control the power supplied to the heating member (140) depending on the internal temperature of the housing (110), sensed by the sensor unit (150).

2. The LED lamp for prevention of freezing according to claim 1, wherein the control unit (200) drops a voltage being applied to the heating member if the internal temperature of the housing (110), sensed by the sensing unit (150), is higher than a predetermined temperature, and
   boosts a voltage being applied to the heating member (140) if the internal temperature of the housing (110), sensed by the sensing unit (150), is lower than the predetermined temperature.

3. The LED lamp for prevention of freezing according to claim 2, wherein the heating member (140) generates heat by being supplied with power from the control unit (200) when power is applied to the LED unit (120).

4. The LED lamp for prevention of freezing according to claim 3, wherein the control unit (200) includes:
   an analysis unit (210) configured to compare the internal temperature of the housing (110), sensed by the sensing unit (150), with the predetermined temperature, and analyze a compared result; and
   a transformer unit (220) configured to receive the compared result from the analysis unit (210) and boost or drop a voltage to be applied the heating member (140) based on the compared result.

5. The LED lamp for prevention of freezing according to claim 4, wherein the predetermined temperature ranges from 40° C. to 60° C.

6. The LED lamp for prevention of freezing according to claim 1, wherein the heating member (140) is a transparent electrode film attached on the inner surface of the lens.

7. The LED lamp for prevention of freezing according to claim 1, wherein the sensor unit (150) is disposed at a position that is not affected by the lighting light emitted from the LED unit (120).

8. The LED lamp for prevention of freezing according to claim 7, further comprising a reflector (160) disposed at the inside of the housing (110) and configured to receive lighting light emitted from the LED unit (120) and reflect the emitted lighting light to the lens (130),
   wherein the reflector (160) comprises:
   a reflective plate (161) inserted into the internal space part of the housing (110) and configured to receive the lighting light emitted from the LED unit (120);

a frame part (162) formed protrudingly radially from a front end portion of the reflective plate (161) and connected to a front end portion of the housing (110); and a through-hole (163) formed at a vertical portion of the frame part (162) and configured to allow the sensor unit 150 to be inserted thereinto.

\* \* \* \* \*